(12) United States Patent
Kang

(10) Patent No.: US 12,140,922 B2
(45) Date of Patent: Nov. 12, 2024

(54) PLC FOR PROVIDING SPACE-EFFICIENT INPUT/OUTPUT INTERFACE

(71) Applicant: ILPUM CORP., Gunpo-si (KR)

(72) Inventor: Zeajong Kang, Gangwon-do (KR)

(73) Assignee: ILPUM CORP., Gunpo-si (KR)

( * ) Notice: Subject to any disclaimer, the term of this patent is extended or adjusted under 35 U.S.C. 154(b) by 92 days.

(21) Appl. No.: 17/932,411

(22) Filed: Sep. 15, 2022

(65) Prior Publication Data

US 2023/0010380 A1    Jan. 12, 2023

Related U.S. Application Data

(63) Continuation of application No. PCT/KR2021/007110, filed on Jun. 8, 2021.

(30) Foreign Application Priority Data

Nov. 30, 2020  (KR) ........................ 10-2020-0164565

(51) Int. Cl.
*G06F 13/40*  (2006.01)
*G05B 19/05*  (2006.01)

(52) U.S. Cl.
CPC ......... *G05B 19/054* (2013.01); *G05B 19/052* (2013.01); *G06F 13/4022* (2013.01);
(Continued)

(58) Field of Classification Search
None
See application file for complete search history.

(56) References Cited

U.S. PATENT DOCUMENTS 6,526,048 B1 *  2/2003  Francis ................. H04L 49/101
                                                  370/386
7,206,874 B2 *  4/2007  Lee ..................... G06F 13/4027
                                                  710/305

(Continued)

FOREIGN PATENT DOCUMENTS

CN        106843096 A      6/2017
EP        3 439 254 A1     2/2019
(Continued)

OTHER PUBLICATIONS

International Search Report issued in PCT/KR2021/007110; mailed Sep. 17, 2021.
(Continued)

*Primary Examiner* — Michael Sun
(74) *Attorney, Agent, or Firm* — Studebaker & Brackett PC

(57) ABSTRACT

A PLC according to an embodiment of the present invention is disclosed. The PLC according to an embodiment of the present invention comprises: a master unit; and a plurality of interface units which access the master unit via a system bus. The master unit includes: a control unit for controlling input/output and processing commands; and a plurality of first RJ45 terminals for input/output of data, wherein a maximum of eight signals are arranged via each pin of each of the first RJ45 terminals. Each of the interface units includes a connection means for connecting a signal between a second RJ45 terminal for connecting a signal line from each of the first RJ45 terminals and an external device, wherein the interface units are configured to be expandable by the number of the first RJ45 terminals.

8 Claims, 4 Drawing Sheets

(52) U.S. Cl.
CPC .. *G06F 13/4068* (2013.01); *G05B 2219/1109* (2013.01); *G05B 2219/1215* (2013.01)

(56) References Cited

U.S. PATENT DOCUMENTS

| | | | |
|---|---|---|---|
| 2003/0153988 | A1 | 8/2003 | Shepard et al. |
| 2004/0066790 | A1* | 4/2004 | Valavi ............... H04L 69/18 370/465 |
| 2007/0238343 | A1 | 10/2007 | Velleca et al. |
| 2010/0194539 | A1* | 8/2010 | Delamare .......... H01R 13/6658 340/310.18 |
| 2010/0316237 | A1 | 12/2010 | Elberbaum |
| 2011/0163888 | A1* | 7/2011 | Goedde ................. H04N 17/04 340/815.45 |
| 2011/0189886 | A1* | 8/2011 | Chen ...................... H04Q 1/13 439/488 |
| 2014/0269951 | A1 | 9/2014 | Babarskas et al. |

FOREIGN PATENT DOCUMENTS

| | | |
|---|---|---|
| JP | H10-333720 A | 12/1998 |
| JP | 2007-034398 A | 2/2007 |
| JP | 2011-035664 A | 2/2011 |
| KR | 10-2019-0091931 A | 8/2019 |
| WO | 2017/051345 A1 | 3/2017 |

OTHER PUBLICATIONS

An Office Action; "Notice of Reasons for Refusal," mailed by the Japanese Patent Office on Oct. 31, 2023, which corresponds to Japanese Patent Application No. 2022-556606 and is related to U.S. Appl. No. 17/932,411.

The extended European search report issued by the European Patent Office on Feb. 16, 2024, which corresponds to European Patent Application No. 21898252.8-1205 and is related to U.S. Appl. No. 17/932,411.

* cited by examiner

PLC FOR PROVIDING SPACE-EFFICIENT INPUT/OUTPUT INTERFACE

CROSS REFERENCE TO RELATED APPLICATIONS AND CLAIM OF PRIORITY

This application is a Continuation of International Application No. PCT/KR2021/007110, filed Jun. 8, 2021, which claims benefit of priority to Korean Patent Application No. 10-2020-0164565 filed Nov. 30, 2020, the disclosure of which is incorporated herein by reference in its entirety

BACKGROUND

1. Technical Field

The present invention relates to a programmable logic controller (PLC), and more particularly, to a PLC providing a space-efficient input/output interface.

2. Description of the Related Art

The CPU module and input/output module play a key role in the PLC control panel in the automatic control system, but the power supply and terminal block occupy the most space. Conventional PLC usually uses a terminal block or header socket as a terminal, but it is difficult to expand or maintain input/output due to space constraints due to the size of the terminal or wiring complexity.

SUMMARY

An object of the present invention for solving the above problems is to provide a PLC having a simple wiring and a space-efficient input/output interface.

Another object of the present invention for solving the above problems is to provide a master unit of a PLC having a simple wiring and space-efficient input/output interface.

Another object of the present invention for solving the above problems is to provide an interface unit of a PLC having a simple wiring and a space-efficient input/output interface.

The present invention for solving the above object provides a PLC comprising a master unit and a plurality of interface units connected to the master unit through a system bus. The master unit includes a control unit for controlling an input/output and processing a commands and a plurality of first RJ45 terminals for input/output of data, and a maximum of eight signals are arranged through each pin of each of the first RJ45 terminals, and the interface unit includes a second RJ45 terminal for connecting a signal line from the first RJ45 terminal and a connection means for connecting a signal with an external device, and the interface unit provides a PLC that is expandable by the number of the first RJ45 terminals.

The present invention for solving the another above object provides a master unit of a PLC for connection via at least one interface unit and a system bus comprises a control unit for controlling an input/output and processing a command and at least one first RJ45 terminal for input/output of data, a maximum of eight signals are arranged through each pin of each of the first RJ45 terminals, and a signal line is connected through a connection between the first RJ45 terminal and a second RJ45 terminal included in the interface unit, the interface unit is connected as many as the number of the first RJ45 terminal.

The present invention for solving the other above object provides an interface unit for connecting to the master unit of the PLC through a system bus comprises a second RJ45 terminal for connecting a signal line from a first RJ45 terminal of the master unit and a connection means for connecting a signal with an external device, according to a configuration of the master unit, the interface unit has a separate COM terminal and connect a common signal line through a COM terminal of the master unit through the COM terminal so that a maximum of eight input/output channels are configured through the second RJ45 terminal, connects a common signal line through a specific pin of the first RJ45 terminal through a specific pin of the second RJ45 terminal so that a maximum of seven input/output channels are configured through the second RJ45 terminal.

The PLC of the present invention can provide a flexible input/output expansion system while uniformizing the size of the bus by using RJ45 and increasing space efficiency by simplifying wiring. In addition, if the PLC of the present invention is used, the status display LED is classified into an LED group for specifying the RJ45 terminal and an LED group for specifying the pin number of the terminal to variably designate the signal line so that it has the advantage of flexibly coping with the expansion of the input/output interface and increasing space efficiency.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
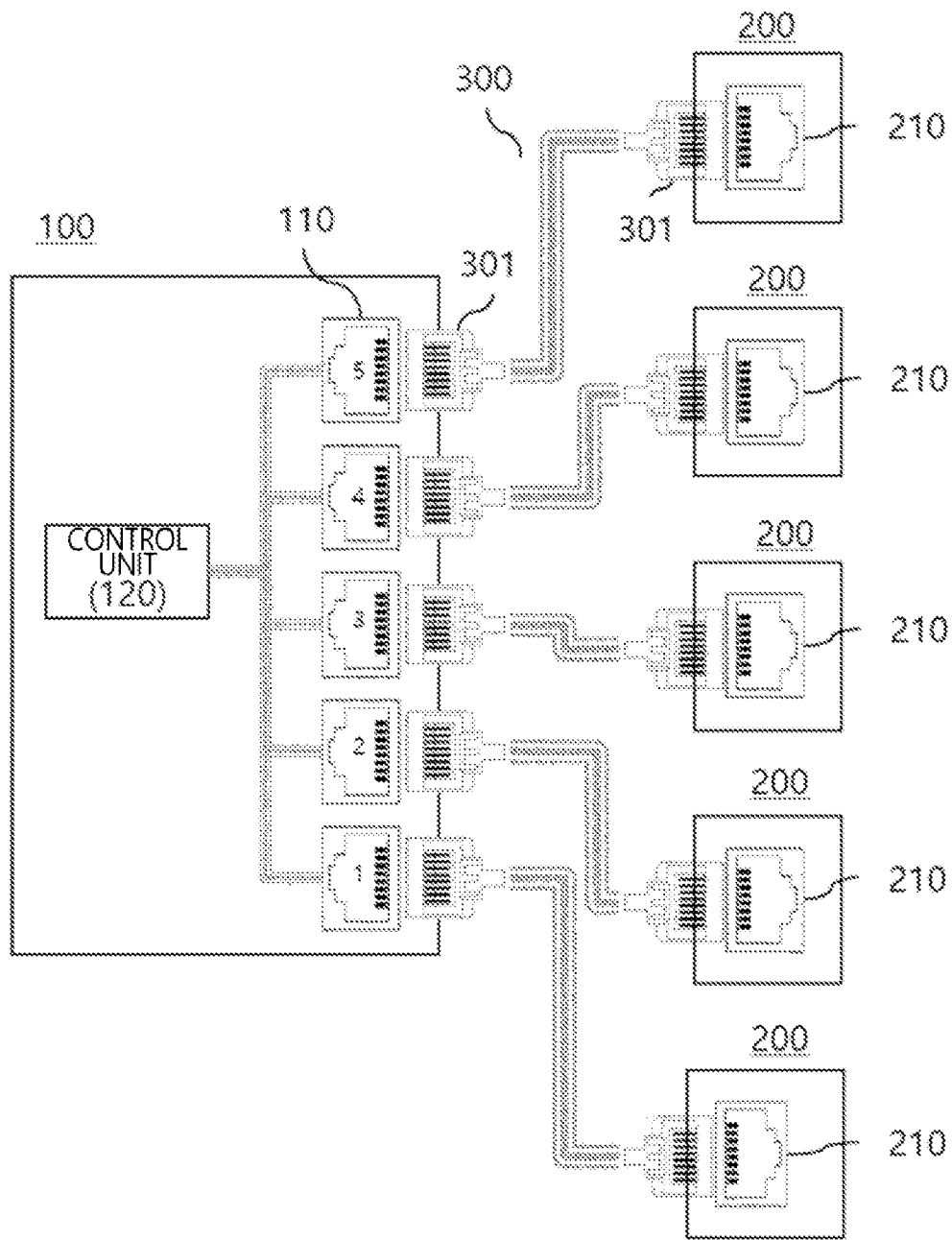
FIG. 1 is a block diagram showing the configuration of a PLC according to an embodiment of the present invention.

While the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the prevent disclosure. Like reference numerals refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the prevent disclosure. As used herein, the singular forms are intended to include the plural forms as well, unless the context clearly indicates otherwise. It will be further understood that the terms "comprises" and/or "comprising" and "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments of the present disclosure will be described with reference to the attached drawings.

As will be exemplarily described below, a programmable logic controller (PLC) according to the present invention is configured around a microprocessor and a memory and may mean a general PLC used in the industry, which comprises a central processing unit (CPU) that serves as a human brain, an input/output unit that connects a signal with external devices, a power supply unit that supplies power to each unit, and a peripheral device that records programs in the memory in the PLC. In addition, the PLC of the present invention may collectively refer to a CPU module, an input/output module (DI module, DO module, AI module, AO module, mixed module, etc.) and special function module.

Therefore, the master unit of the PLC according to the present invention to be described below may refer to a unit that includes a CPU (Central Processing Unit) or MPU (Micro Processor Unit) developed exclusively for the PLC installed, and a RAM (Random Access Memory) and a ROM (Read Only Memory) containing a system program built-in, and has a function of decoding a program stored in the memory, processing a command, and controlling input/output. In addition, the interface unit of the PLC according to the present invention may be a unit that is configured to be physically separated from the master unit and connected through RJ45, and has a connection means for transmitting and receiving signals with an external device (for example, a terminal unit such as a terminal block for coupling input/output signal lines from the outside). The interface unit may be configured by the user to be used for various input/output such as DI, DO, AI, AO, etc. as needed.

In addition, the RJ45 terminal mentioned below may mean a socket capable of connecting an RJ45 connector having eight slots and eight contact parts. The RJ45 cable (or Ethernet cable) may refer to a cable having RJ45 connectors on both sides and having eight signal lines inside. The connection through the master unit and the RJ45 terminal of the interface unit of the present invention may mean direct connection to both terminals through the connector of the RJ45 cable.

Meanwhile, in the following embodiments of the present invention, a general description of a known configuration of the PLC may be omitted, and only the parts necessary to help the understanding of the configuration of the present invention may be described in detail.

FIG. 1 is a block diagram showing the configuration of a PLC according to an embodiment of the present invention.

Referring to FIG. 1, a PLC according to an embodiment of the present invention may include a master unit 100 and a plurality of interface units 200 configured to be connected to the master unit 100 through a system bus. Here, the system bus may mean a path, through which each hardware device or component can communicate with each other. The master unit 100 may be configured to include a control unit 120 for controlling input/output and processing a command, and a plurality of first RJ45 terminals 110 for input/output of data. At this time, the control unit 120 may be a component that performs the role of the CPU (or MPU).

In addition, each interface unit 200 may be configured to include a second RJ45 terminal 210 for connecting a signal line from the first RJ45 terminal 110 of the master unit 100. In addition, the interface unit 200 may include a connection means (not shown) for transmitting and receiving signals with an external device. For example, it may include a terminal (e.g., a terminal block) for coupling input/output signal lines from the outside. In addition, the interface unit 200 may include necessary components (e.g., relays, etc.) according to the type of a signal line.

Data transmission between the master unit 100 and the interface unit 200 may be made through the cable (e.g., Ethernet cable) connection 300 through the RJ45 terminals 110 and 210 on both sides.

Accordingly, a maximum of eight signals can be arranged using each pin (eight pins) of each first RJ45 terminal 110. In addition, the interface unit 200 may be expanded by the number of the first RJ45 terminals 110. For example, in the case of disposing the five first RJ45 terminals 110 on the master unit 100 as shown in FIG. 1, five interface units 200 can be connected through the connection between the RJ45 terminals 110 and 210 on both sides, and a maximum of eight signal lines can be connected for each interface unit 200. In addition, each interface unit 200 may include necessary components according to the type of signal line. For example, in case of configuring an 8-channel digital output, 8 relays and a terminal block for input/output from the outside, etc. can be included.

That is, by connecting both terminals 110 and 210 using the RJ45 cable 300 and the RJ45 connector 301, the space occupied by the terminals is saved and the wiring is simplified to increase the space efficiency and configure a consistent input/output expansion system. At this time, the arrangement of the signal lines of the RJ45 of the present invention is a configuration for the transmission of input/output signals and is not limited by the wiring method of Ethernet communication.

On the other hand, all eight pins of each first RJ45 terminal 110 of the master unit 100 may be used as the same type of signal, or used as several types of signals (e.g., DI, DO, AI, AO, UI, etc.) by mixing them. Except for the pin used as a common signal line, the same type of signal may be used, and the signals may be arranged in the same order as the pin number. For example, a digital input (DI) is arranged to the first pin of the first RJ45 terminal 110, a digital output (DO) is arranged to the second pin of the first RJ45 terminal 110, an analog input (AI) is arranged to the third pin of the first RJ45 terminal 110, an analog output (AO) is arranged to the fourth pin of the first RJ45 110, and a universal input (UI) is arranged to the fifth pin of the first RJ45 110. In a such way, by arranging the same type of signal to one terminal and arranging the signals in the same order as the pin numbers in the corresponding interface unit 200, the efficiency of the configuration and ease of use can be improved.

Hereinafter, a configuration of a common signal line of a PLC according to an embodiment of the present invention will be described with reference to the drawings.

Figure 2:
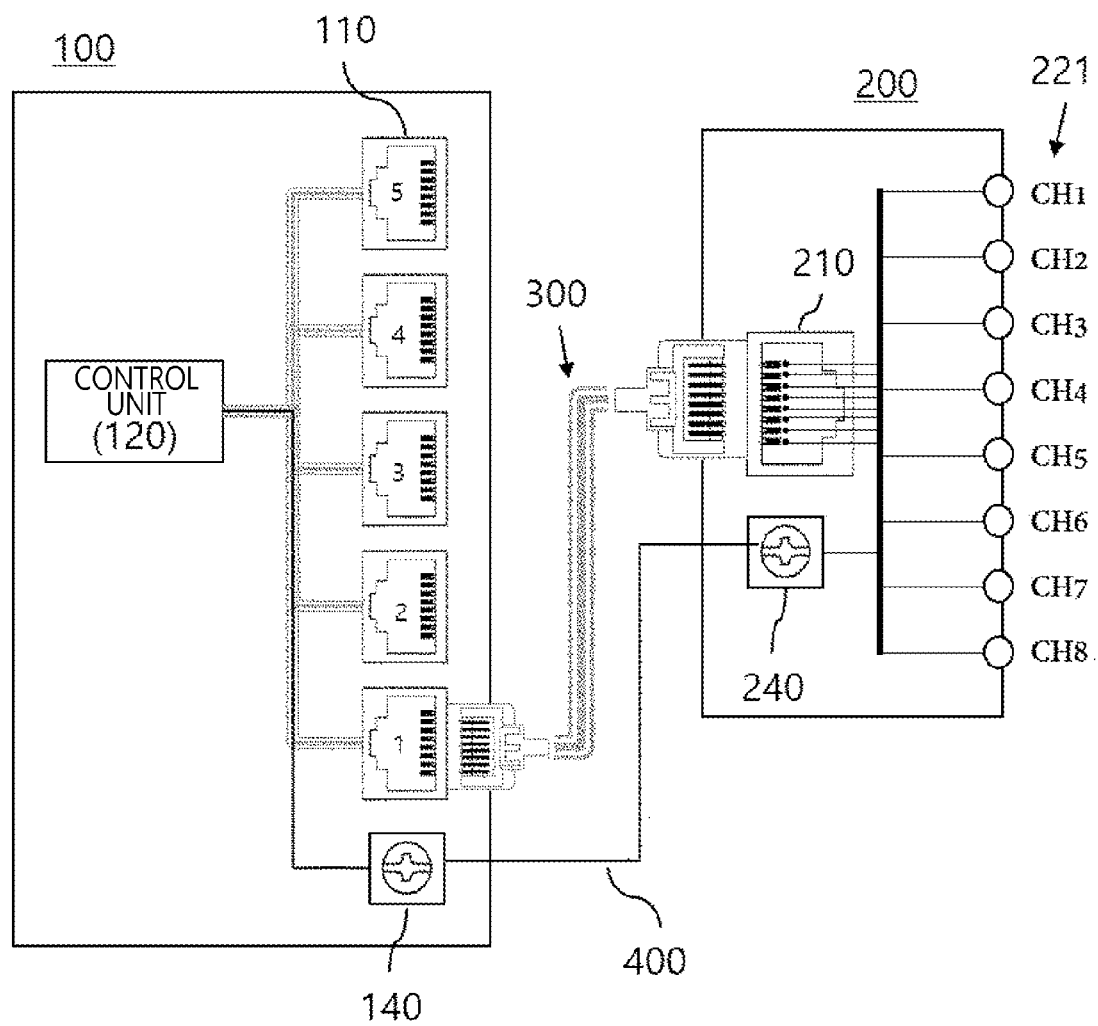
FIG. 2 is a block diagram showing an example of connection of a common signal line of a PLC according to an embodiment of the present invention.

FIG. 2 is a block diagram showing an example of connection of a common signal line of a PLC according to an embodiment of the present invention.

Referring to FIG. 2, the master unit 100 of the PLC according to an embodiment of the present invention has a separate COM terminal 140 in order to allocate a common signal commonly used by eight pin signal lines of the first RJ45 terminal 110. The common signal line allocated to the COM terminal 140 may be connected to the COM terminal 240 provided in the interface unit 200 using a separate cable 400. Accordingly, since all eight pins of the both RJ45 terminals 110 and 210 may be used as input/output signal lines, and accordingly, a maximum of eight input/output channels 221 may be configured in the interface unit 200. Here, the COM terminal may refer to a commonly known terminal configured to allow multiple lines to be connected.

That is, for example, as shown in FIG. 2, when all eight pins of the first terminal 110 are used as a digital input and the common signal is arranged to a separate terminal 140, the corresponding interface unit 200 configures the 8-channel digital input 221, thereby increasing space efficiency. The common signal line may be expanded and connected through interconnection between COM terminals 240 and 240 of the interface unit disposed adjacently.

Hereinafter, another configuration of a common signal line of a PLC according to an embodiment of the present invention will be described with reference to the drawings.

Figure 3:
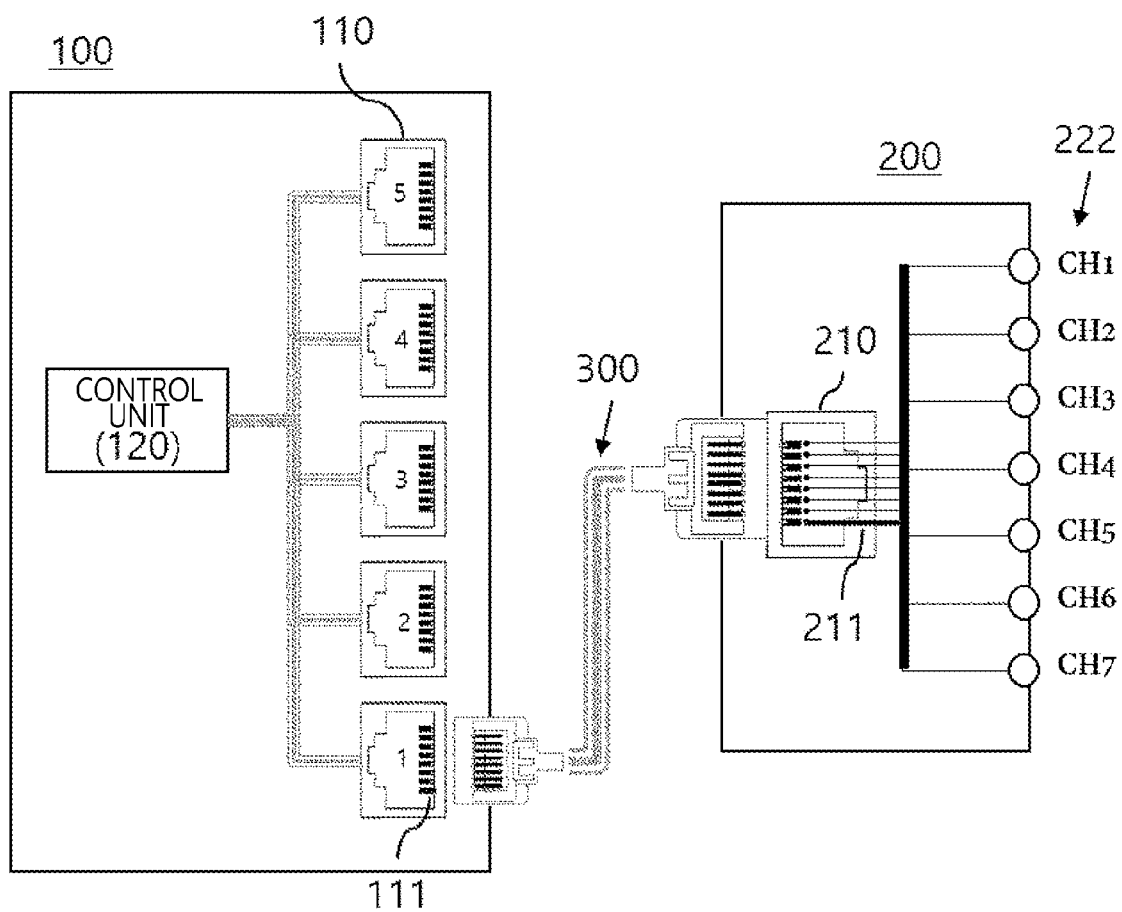
FIG. 3 is a block diagram showing another example of a common signal line connection of a PLC according to an embodiment of the present invention.

FIG. 3 is a block diagram showing another example of a common signal line connection of a PLC according to an embodiment of the present invention.

Referring to FIG. 3, the master unit 100 of the PLC according to an embodiment of the present invention uses a specific pin 111 of eight pins of each terminal for each first RJ45 110 as a common signal line, and a common signal line may be configured to be connected through a corresponding pin 211 of the second RJ45 terminal 210 of the interface unit 200. Accordingly, seven pins of both RJ45 terminals 110 and 210 may be used as input/output signal lines, and accordingly, a maximum of seven input/output channels 22 may be configured for each interface unit 200.

That is, for example, as shown in FIG. 3, in the case of the first terminal, when the first pin 111 is used as a common signal line and all other seven pins are used as digital inputs, the corresponding interface unit 200 may configure the 7-channel digital input 222 based on the remaining seven pins except for the first pin 211. Accordingly, since a separate terminal for the common signal line is not required, there is an advantage in that the wiring becomes simpler than the configuration of FIG. 2.

Figure 4:
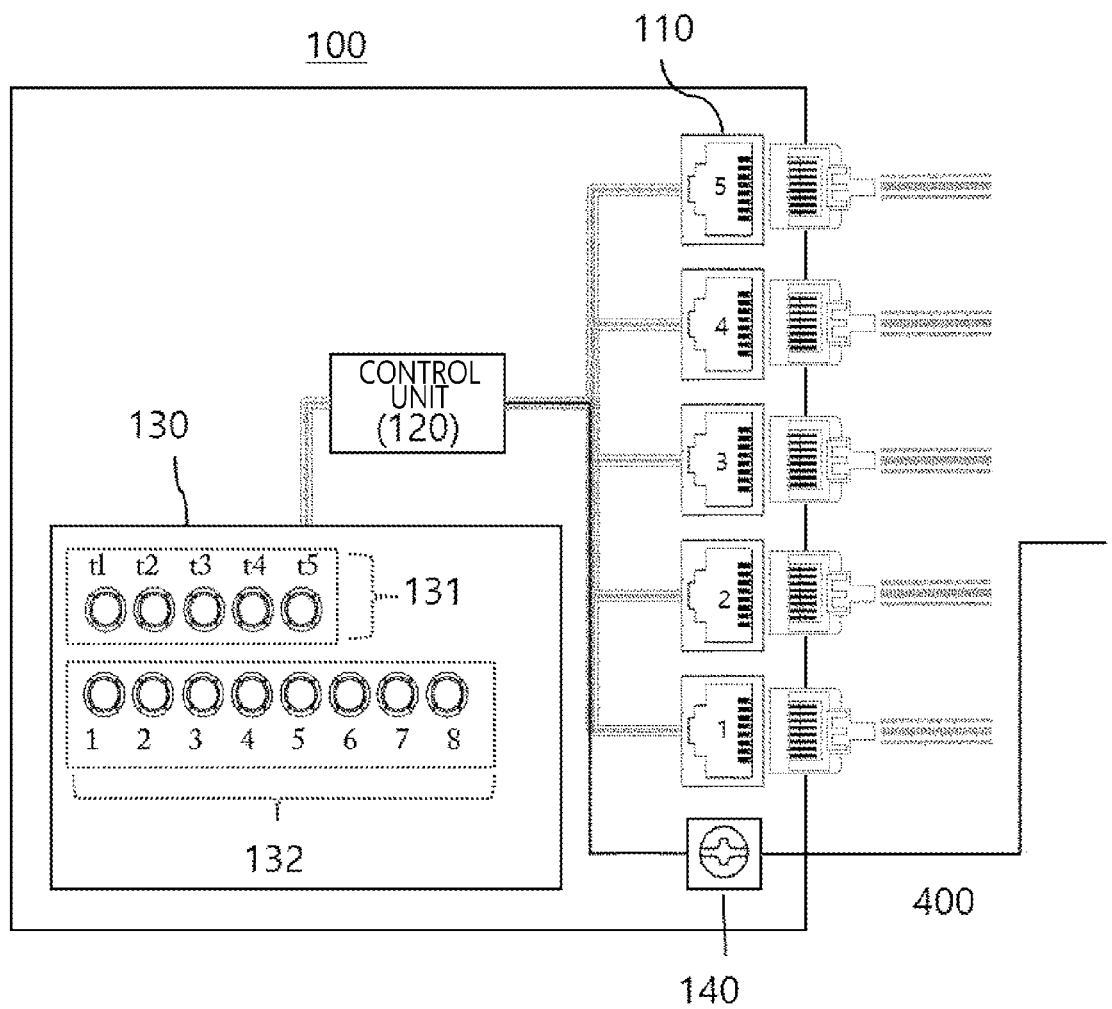
FIG. 4 is a block diagram showing the configuration of the status display LED of the PLC according to an embodiment of the present invention.

FIG. 4 is a block diagram showing the configuration of the status display LED of the PLC according to an embodiment of the present invention.

Referring to FIG. 4, the master unit 100 of the PLC according to an embodiment of the present invention may further include a plurality of status display LEDs 130 for displaying the state of the signal line. The status display LEDs 130 may be classified into a first LED group 131 for specifying the first RJ45 terminal 110, to which the signal line to display the state belongs, and the second LED group 132 for specifying the pin number of the first RJ45 terminal 110, to which the signal line belongs. Accordingly, the control unit 120 may display the state of the signal line to a predetermined LED of the first LED group 111 and the second LED group 112 while rotating at a constant cycle for each first RJ45 terminal 110.

At this time, it is preferable that the first LED group 131 includes at least as many LEDs as the number of the first RJ45 terminals 110 included in the master unit 100, and the second LED group 132 includes at least eight LEDs, which is the number of pins of the first RJ45 terminal 110.

For example, as shown in FIG. 4, the control unit 120 may display the state of the signal line on the t3-LED of the first LED group 131 and the second LED of the second LED group 132 in order to display the state of the signal line of the second pin of the third terminal 110. The number of each component shown in the drawings is merely an example to help the understanding of the invention and is not intended to limit the invention.

In the conventional PLC, the target displayed by the status LED is fixed in advance, whereas the PLC of the present invention classifies the status LED 130 into groups as described above and the target displayed by the status LED is variably designated, thereby guaranteeing high space efficiency and flexible expansion of input/output channels.

On the other hand, the status LED 140 displays the state of the signal line according to the conditions set inside the PLC, and the type of signal outputted through the status LED 140 include digital input, digital output, analog input, analog output, universal input, and the like. In the case of analog input, analog output, and universal input, the control unit 120 may apply a preset threshold value for each signal type to output the state of the signal line to the status display LED 140.

For example, when the threshold value of the voltage is specified as 3V, when 3.1V is applied through the third channel of the interface unit 200 connected to the second RJ45 terminal 110 configured to be used as an analog input, the t2-LED of the first LED group 131 and the second LED of the second LED group 132 may be turned on, and when 2.9V is applied, they may be turned off. Such function can be useful when building or maintaining an automatic control system.

The PLC of the present invention as described above can provide a flexible input/output expansion system while uniformizing the size of a bus, simplifying wiring, and increasing space efficiency by using RJ45. In addition, it has the advantage of flexibly coping with the expansion of input/output and enhancing the space efficiency by varying the designated signal line through grouping of status display LED.

Although the above has been described with reference to preferred embodiments of the present invention, those skilled in the art can understand that the present invention can be variously modified within the scope without departing from the spirit and scope of the present invention as set forth in the claims below.

What is claimed is:
1. A PLC comprising:
   a master unit and a plurality of interface units connected to the master unit through a system bus,
   wherein the master unit includes a control unit for controlling an input/output and processing a commands and a plurality of first RJ45 terminals for input/output of data, and a maximum of eight signals are arranged through each pin of each of the first RJ45 terminals, wherein the interface unit includes a second RJ45 terminal for connecting a signal line from the first RJ45 terminal and a connection means for connecting a signal with an external device, wherein the interface unit is expandable by the number of the first RJ45 terminals, wherein the master unit further comprises a plurality of status display LEDs (Light Emitting Diode) for displaying a state of a signal line, wherein the status display LEDs are classified into a first LED group provided at least as many as the number of the first RJ45 terminals to specify a first RJ45 terminal, to which a signal line to display a state belongs, and a second LED group provided at least as many as the number of pins of each first RJ45 terminal to specify a pin number of the first RJ45 terminal, and wherein the state of the signal line is output to a predetermined LED of the first LED group and the second LED group at a constant cycle for each first RJ45 terminal.

2. The PLC of claim 1, wherein eight pins of each first RJ45 terminal of the master unit are all used as the same type of signal line except for a common signal line, and signals are arranged in the same order as a pin number.

3. The PLC of claim 1, wherein the master unit includes a separate COM terminal for a common signal line commonly used by all signal lines of the plurality of first RJ45 terminals, wherein the common signal line is configured to be connected to a COM terminal provided in the interface unit so that each interface unit configures a maximum of eight input/output channels through the second RJ45 terminal.

4. The PLC of claim 1, wherein the master unit uses a specific pin among eight pins of each terminal as a common signal line for each of the first RJ45 terminals, wherein the common signal line is configured to be connected through a corresponding pin of the second RJ45 terminal so that each interface unit configures a maximum of seven input/output channels through the second RJ45 terminal.

5. The PLC of claim 1, wherein, by applying a preset threshold value for each signal type in the case of an analog input, analog output, and universal input, the state of the signal line is output to the status display LED according to the threshold value.

6. A master unit of a PLC for connection via at least one interface unit and a system bus comprising:

a control unit for controlling an input/output and processing a command; and at least one first RJ45 terminal for input/output of data, wherein a maximum of eight signals are arranged through each pin of each of the first RJ45 terminals, and a signal line is connected through a connection between the first RJ45 terminal and a second RJ45 terminal included in the interface unit, wherein the interface unit is connected as many as the number of the first RJ45 terminal, wherein the master unit further includes a plurality of status display LEDs for displaying a state of a signal line, wherein the status display LEDs are classified into a first LED group provided at least as many as the number of the first RJ45 terminal to specify a first RJ45 terminal, to which a signal line to display a state belongs, and a second LED group provided at least as many as the number of pins of each first RJ45 terminal to specify a pin number of the first RJ45 terminal, and wherein the state of the signal line is output to a predetermined LED of the first LED group and the second LED group at a constant cycle for each of the first RJ45 terminal.

7. The master unit of claim 6, wherein the master unit has a separate COM terminal for a common signal line commonly used by all signal lines of the first RJ45 terminal so that the common signal line is connected to a COM terminal provided in the interface unit through the COM terminal, wherein a specific pin among eight pins of each terminal is used as a common signal line for each of the first RJ45 terminal, and the common signal line is connected through a corresponding pin of the second RJ45 terminal.

8. An interface unit for connecting to the master unit of the PLC of claim 6 through a system bus comprising:

a second RJ45 terminal for connecting a signal line from a first RJ45 terminal of the master unit and a connection means for connecting a signal with an external device, wherein, according to a configuration of the master unit, the interface unit, has a separate COM terminal and connects a common signal line through a COM terminal of the master unit through the COM terminal so that a maximum of eight input/output channels are configured through the second RJ45 terminal, connects a common signal line through a specific pin of the first RJ45 terminal through a specific pin of the second RJ45 terminal so that a maximum of seven input/output channels are configured through the second RJ45 terminal.

* * * * *